United States Patent
Morin

(10) Patent No.: US 9,202,123 B2
(45) Date of Patent: Dec. 1, 2015

(54) SPHERICAL PIN-HOLE MODEL FOR USE WITH CAMERA LENS IMAGE DATA

(71) Applicant: NovAtel Inc., Calgary (CA)

(72) Inventor: Kristian Morin, Calgary (CA)

(73) Assignee: NovAtel Inc., Calgary (CA)

( * ) Notice: Subject to any disclaimer, the term of this patent is extended or adjusted under 35 U.S.C. 154(b) by 594 days.

(21) Appl. No.: 13/669,987

(22) Filed: Nov. 6, 2012

(65) Prior Publication Data
US 2014/0125812 A1 May 8, 2014

(51) Int. Cl.
*H04N 5/225* (2006.01)
*H04N 5/77* (2006.01)
*G06K 9/20* (2006.01)
*G06K 9/00* (2006.01)

(52) U.S. Cl.
CPC .............. *G06K 9/209* (2013.01); *G06K 9/00664* (2013.01)

(58) Field of Classification Search
CPC ........................... G06K 9/209; G06K 9/00664
USPC .......... 386/200, 223, 224, 341, 227; 348/169, 348/175, 187
See application file for complete search history.

(56) References Cited

U.S. PATENT DOCUMENTS

2013/0124159 A1* 5/2013 Chen et al. ................. 703/2

* cited by examiner

*Primary Examiner* — Robert Chevalier
(74) *Attorney, Agent, or Firm* — Cesari and McKenna, LLP; Patricia A. Sheehan

(57) ABSTRACT

A camera image processing subsystem processes image data corresponding to observations taken through a lens of focal point f using a spherical pin-hole model that maps the image data through a perspective center of a pin-hole prospective plane located within the lens onto a model sphere that is a focal length f in diameter and has its center at the perspective center of the pin-hole prospective plane. The subsystem models systematic distortion as rotation about coordinate axis of the pin-hole prospective plane, and maps all of the data, over the entire field of view of the lens, to corresponding spherical coordinates.

19 Claims, 6 Drawing Sheets

SPHERICAL PIN-HOLE MODEL FOR USE WITH CAMERA LENS IMAGE DATA

BACKGROUND OF THE INVENTION

1. Field of the Invention

The invention relates generally to camera vision systems for navigation and/or object avoidance systems and, more particularly, to the processing of camera images taken through lenses that have systematic distortions.

2. Background Information

Robotic or vehicle vision navigation and/or object avoidance systems process observations made using one or more camera lenses and identify, in processed image data, various local features or objects as associated patterns in the data. The systems determine the relative locations of the features and objects, that is, locations relative to the cameras, and steer the robots or vehicles along designated paths and/or avoid objects as the robot or vehicle moves.

To process the images captured by the camera, the observations, that is, the raw image information, are processed in a known manner into pixels, or image point data. To determine relative locations of features or object represented as patterns in the processed data, the systems operate in a known manner to mathematically map the data onto a model image plane using a well-known pin-hole camera model, to determine x, y, z coordinates for the data. The coordinates are then used to determine the locations of the objects or features relative to the camera, all in a known manner.

The pin-hole camera model consists of a pin-hole prospective plane with a perspective center that is inside the physical lens, a model image plane that is a focal length f behind the lens, and an optical axis that is perpendicular to the model image plane and extends through the perspective center. Using the pin-hole camera model, light rays that pass through the lens from a point on an object located before the camera are mapped to points, and thus, coordinates on the model image plane using straight lines that pass through the perspective center. Based on the coordinates of the mapped data in the model image points the relative locations of objects or features identified as patterns in the mapped data can then be determined.

Most cameras do not conform to a "perfect" pin-hole camera in the sense that the camera lenses bend and/or distort the light rays. Accordingly, corrections are added to the image data to compensate for the departure from the pin-hole camera model. The corrections are related to what is commonly referred to as "radial symmetric lens distortion." Examples of such distortion are barrel distortions, pin cushion distortion and combinations thereof. The corrections, which are applied to the image data as part of the mapping to the model image plane, are based on the incident angles θ of the light rays, that is, the angles of the rays from the object to the perspective center with respect to the camera optical axis.

After correction, the mapped data in the model image plane should have coordinates that would have been observed if the camera lens conformed to the perfect pin-hole camera. The locations of local features and objects relative to the camera are determined based on the corrected coordinates of the data in the associated patterns.

The larger the field of view of, for example, a fish-eye lens, the greater the distortion. The distortion associated with a fish-eye lens can be thought of as extreme radial symmetric distortion. Modeling the corrections for the fish-eye lens provides associated coordinate correction terms that grow exponentially as the incident angles increase. When the incident angles are greater than or equal to ±90°, the conventional pin-hole camera model becomes undefined, since the associated image rays that pass through the perspective center of the pin-hole plane do not intersect the model image plane. Accordingly, observations corresponding to angles of incidence greater than or equal to ±90°, i.e., information from the edges of fields of view of greater than 180°, are lost to navigation and/or object avoidance operations.

Further, errors in the corrections applied to the image data are incorporated into the measurements made using the modeled image data. For fish-eye lenses, with the correction terms becoming exponentially larger as the incident angles increase, the measurement errors also rapidly grow. Accordingly, at incident angles of approximately ±80° to ±85°, the measurements essentially become unstable. Thus, the corresponding observations are also lost to the navigation and/or object avoidance operations.

The conventional pin-hole camera model works well, even for cameras with extreme radial symmetric lens distortion, such as fish-eye lens, for many situations, because information at the edges of the field of view may not be needed. However, when the robot or vehicle is, for example, sufficiently close to a wall, the observations from the constrained field of view may consist of only data corresponding to an essentially featureless wall, and thus, be devoid of features that may aid in the navigation and/or object avoidance operations. The camera, however, through the fish-eye lens, captures other features or objects in its actual, wider, field of view, such as, for example, ceiling or floor tile patterns, overhead lighting fixtures, rug patterns, and so forth, and image data relating to these observations could be useful to the system.

SUMMARY OF THE INVENTION

A camera image processing subsystem processes image observation data using a spherical pin-hole model that maps the data through a perspective center of a pin-hole prospective plane located within the lens onto a model sphere that is a focal length f in diameter and has its center at the perspective center of the pin-hole prospective plane. The subsystem models systematic distortions as rotation about coordinate axes of the pin-hole prospective plane, and the spherical pin-hole model reliably maps all of the data, over the entire field of view of the lens, to corresponding spherical coordinates. The relative locations of features and objects located anywhere within the field of view of the lens may then be determined from the spherical coordinates of the associated data.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
FIG. 1 depicts an image taken by a camera with a fish-eye lens.
Figure 2:
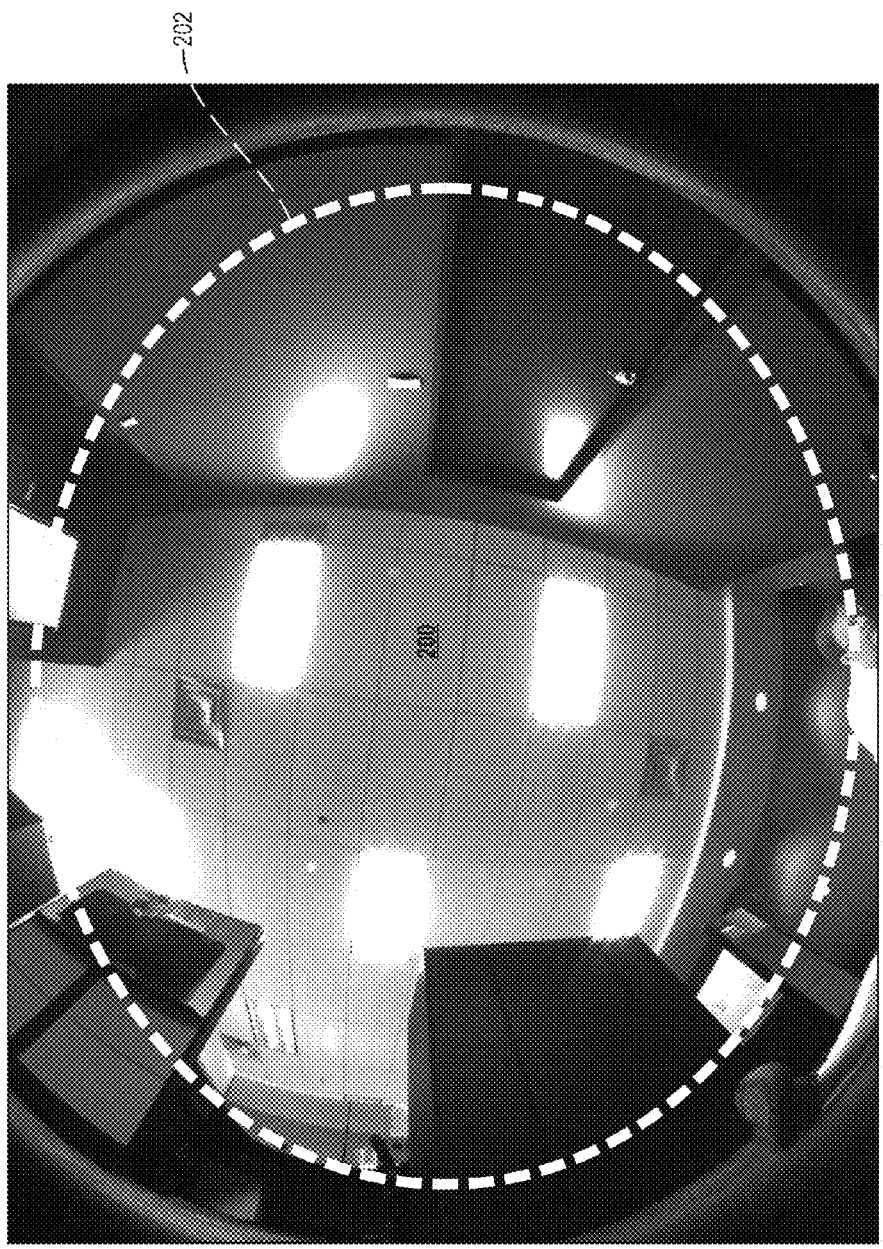
FIG. 2 depicts in the image of FIG. 1 regions from which data are usable and unusable, respectively, for object identification and location with a conventional pin-hole model.

FIG. 1 depicts an image 100 taken by a camera using a fish-eye lens with a field of view of greater than ±90°. FIG. 2 illustrates a region 200 of the image 100 that corresponds to the observations that are available for use to determine corresponding image data point coordinates by a vision navigation and/or object avoidance system that employs a conventional pin-hole camera model. The observations corresponding to the cross-hatched region 202 of the image 100, i.e., the observations with angles of incidence greater than ±85° are not mapped sufficiently reliably, if at all, by the conventional pin-hole model, and thus, cannot be used to determine corresponding image data point coordinates. As is known, navigation and object avoidance systems use only the observations for which image data point coordinates can be reliably determined for navigation and object avoidance operations.

The system described below with reference to FIGS. 3-6, maps the observations using a spherical pin-hole model, which provides spherical coordinates for the observations over the entire field of view. The system thus allows all of the observations to be used for navigation and/or object avoidance. Accordingly, the system described below utilizes the data from both of the regions 200 and 202 of FIG. 2 for navigation and/or object avoidance.

Figure 3:
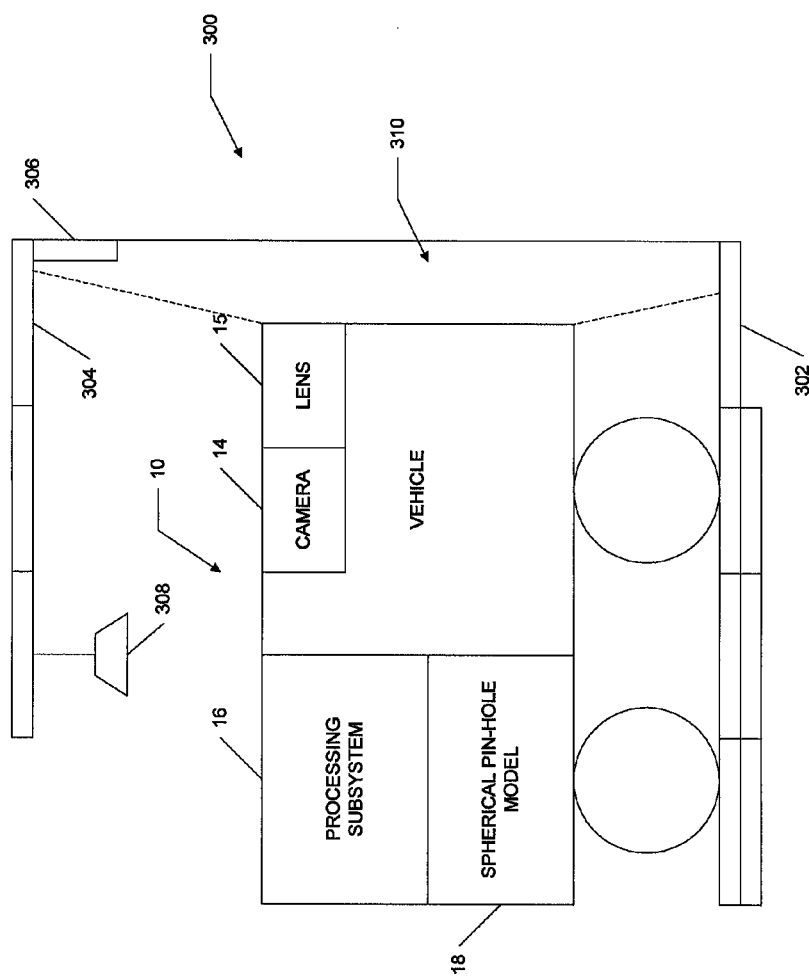
FIG. 3 is a functional block diagram of a system constructed in accordance with the invention.

Referring now to FIG. 3, a vehicle 10 includes a camera 14 with a fish-eye lens 15. All of the observations made by the camera are provided to a processing subsystem 16, which maps the observations, in the form of pixel or image data, from the entire field of view of the lens 15 to image data coordinates using the spherical pin-hole model, which is depicted in the drawing as processor block 18. The processing subsystem further processes the image data, to detect local features or objects as patterns in the data, and determines the locations of the features and/or objects relative to the camera based on the spherical coordinates assigned to the data by the model 18. Thus, the processing subsystem has available observations from the entire field of view of the lens 15 for navigation and object avoidance purposes rather than the constrained field of view associated with systems that utilize the conventional pin-hole camera model.

Figure 4:
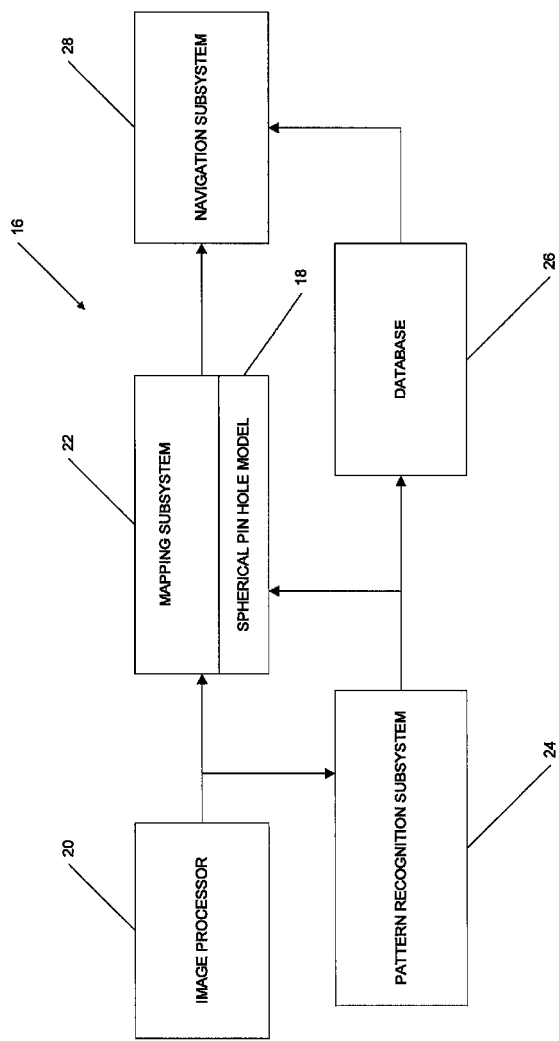
FIG. 4 is a more detailed functional block diagram.

Referring now also to FIG. 4, the processing subsystem 16 includes an image processor 20 that operates in a known manner to process the observations and produce the corresponding image data, which are hereinafter also referred to as respective "image data points." A mapping subsystem 22 utilizes the spherical pin-hole model 18 and maps the image data onto a model sphere, to produce corresponding spherical coordinates for the respective image data points. The spherical pin-hole model 18 is discussed in more detail below with reference to FIG. 5.

A pattern recognition subsystem 24 operates in a known manner to identify local features and objects as patterns in the image data. The object or feature may be, for example, a given fixture, wall trim, patterned floor or ceiling tiles, and so forth. The mapping subsystem provides the spherical coordinates for the image data points associated with the respective patterns and a navigation subsystem 28. The navigation subsystem then determines the locations of the features and objects relative to the camera based on the spherical coordinates. The navigation subsystem also directs the vehicle 10 along a desired route, for example, past an identified feature and/or around an identified object.

As appropriate, the pattern recognition subsystem 24 provides pattern information to a database 26, which determines if the detected pattern denotes an object or feature that has been previously identified and whose global or local position is known. If the global or local position of an identified object or feature is known, the position information is used also by a navigation control subsystem 28 along with the location of the object or feature relative to the camera, to direct the vehicle 10 in the desired direction and/or to avoid objects as the vehicle moves.

As discussed, the pattern recognition subsystem 24 has available to it data representing the entire field of view of the fish-eye lens, and thus, can recognize patterns that are associated with features or objects at the edges of the field of view. Accordingly, when the camera lens 15 is close to a wall 300, as depicted in FIG. 3, the system may identify features and/or objects at the edges of the field of view that would be unavailable to the system if the system were instead utilizing a convention pin-hole model. In the example, if the camera is sufficiently close to the wall 300, conventional models may not utilize the data relating to a plurality of floor tiles 302 and/or ceiling tiles 302, the light fixture 308, and so forth, since these features and objects appear only at the edges of a 180° or greater field of view of the lens 15. Without the use of the data corresponding to the edges of the field of view, the navigation subsystem would only have available to it the data corresponding to at most a constrained field of view 30 of approximately 170°, as depicted in the drawing by dotted lines. Thus, observations corresponding essentially only to the features of a section of the wall 300 and at most the wall trim 306 and one of the floor tiles 302 are available to the conventional system.

Figure 5A:
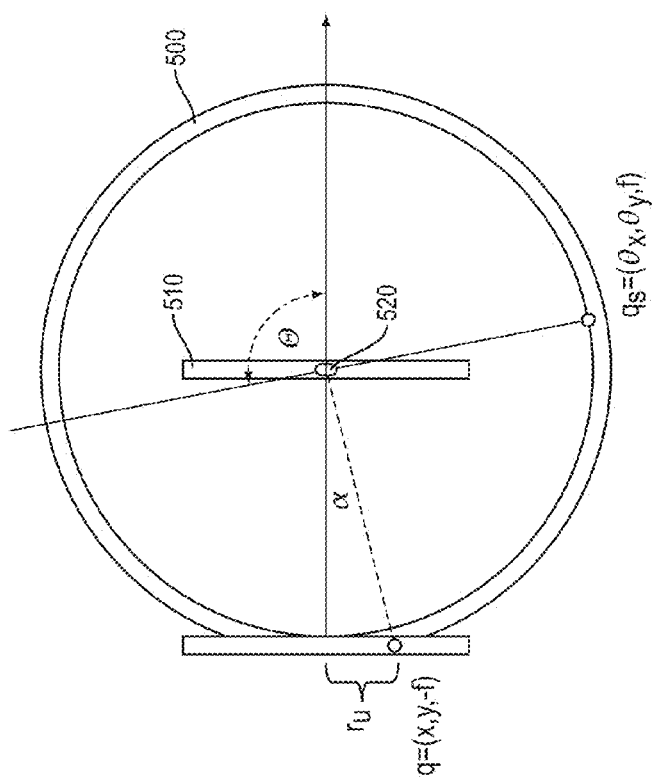
FIGS. 5A-B diagrams showing features of a spherical pin-hole model used by the system of FIG. 3.
Figure 5B:
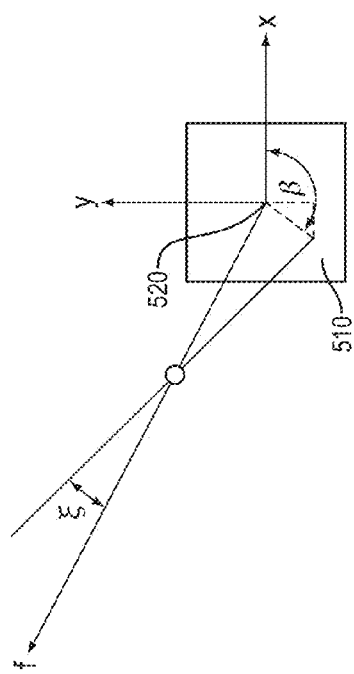
Figure 6:
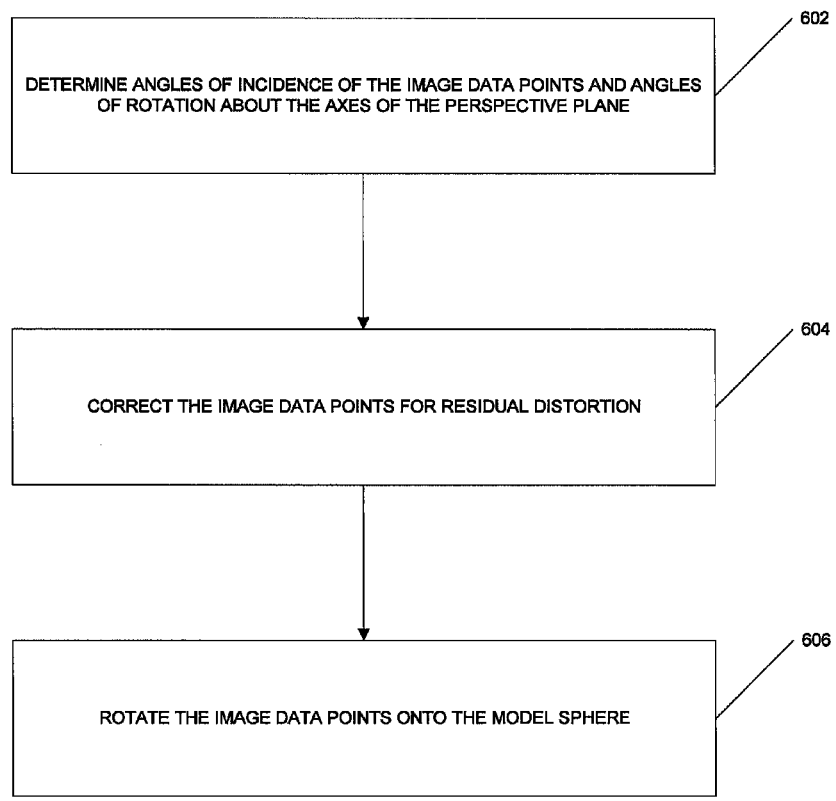
FIG. 6 is a flowchart of the operations of the mapping subsystem of FIG. 4.

Referring now also to FIGS. 5A-B and 6, the mapping subsystem 22 utilizes a spherical pin-hole model 18 that maps image data onto a spherical surface 500. More specifically, the mapping subsystem 22 utilizes a spherical pin-hole model that maps image data onto a sphere of diameter f that is centered at the prospective center 520 of a pin-hole model plane 510 that extends through the camera lens.

Rather than correct the radial systemic lens distortion associated with, for example, the fish-eye lens 15, the mapping subsystem 22 models the systematic lens distortion, that is, the extreme radial symmetric distortion, as rotation about the coordinate axes of the prospective plane 510. Accordingly, the mapping system calculates the angles of incidence associated with the image data point, and determines the rotations about the X and Y axes of the pin-hole prospective plane. The model 18 also corrects for higher order residual-systematic lens distortion, in a known manner, based on the physical characteristics of the lens, that is, using the lens maker equation.

More specifically, for each image data point, the spherical model 18 determines a rotation matrix that is based on the associated incident angle $\theta$, to map the image data point onto the model sphere 500. By way of explanation, starting from the image data point, the modeling subsystem 22 determines an image plane angle $\alpha$, which is the angle from the image data point to the prospective center 510. Based on the characteristics of the lens 15, the incident angle $\theta$ is then determined from the angle $\alpha$. The model then re-maps the image point data through the perspective center 520 to intersect the sphere 500 using the incident angle $\theta$, such that the data point has spherical coordinates $\theta_x$, $\theta_y$, f. Thus, even when the incident angle is greater than ±90°, the spherical model produces reliable spherical coordinates for the image data point.

For a given image data point, the subsystem 22 calculates, in a known manner, a first rotation matrix M that relates the object datum and the camera datum based on the pitch, roll, heading of the camera. The matrix M is used in the collinearity equations that describe the relationship between an arbitrary 3 dimensional observation data point and where the associated data point appears on the camera image, i.e., the relative location of the image data point. Then, rather than applying corrections to the image point data to correct for the radial systemic distortion of the fish-eye lens, and thus, correct the mapping of the data onto an image model plane, the mapping subsystem 22 treats the radial spherical distortion as rotation about the X and Y axes of the pin-hole perspective plane 510 and maps the image data points onto the sphere 500.

To do this, the subsystem 22 calculates, based on the angle of incidence θ, a rotation angle β about the Z axis of the pin-hole perspective plane 510 to align the camera axis 515 with the optical axis and a further rotation angle ξ about the Y axis of the prospective plane to rotate the image data point to the sphere 500. (Step 602).

$$R \cdot \vec{x} = 0, \text{ with } \vec{x} = \begin{pmatrix} x \\ y \\ f \end{pmatrix}.$$

There are multiple solutions to R, and the subsystem in the example uses: $R = R_2(\xi) \cdot R_3(\beta)$ where, for a fish-eye lens:

$$\beta = \arctan\left(\frac{y}{x}\right)$$

$$\xi = \frac{-r}{f} \text{ where } r = \sqrt{x^2 + y^2}$$

In Step 604, the image observations are first corrected in a conventional manner for non-systematic lens distortion, that is, residual distortion from an ideal lens:

$$\begin{pmatrix} x \\ y \end{pmatrix} = \begin{pmatrix} x - x_0 - r_{dx} \\ y - y_0 - y_{dy} \end{pmatrix}$$

where $(x_0, y_0)$ are the principle point offsets, and $(r_{dx}, r_{dy})$ are the lens distortion corrections, and $\Delta_{r_d} = k_1 r^3 + k_2 r^5 + k_3 r^7$.

In step 606, the corrected data are rotated by the rotation matrices R and M:

$$kRM \begin{pmatrix} x - x_X \\ y - y_L \\ z - z_L \end{pmatrix}$$

where (x y z) are object point coordinates, $(x_L, y_L, z_L)$ is the camera position in object space, k is the scale factor for each point, M is the rotation between object space and camera space, and R is the rotation to project the image data points onto the sphere 500. As discussed, the mapping to the sphere 500 provides a reliable mechanism to handle the systematic distortion, and thus, allows the system to utilize the observations from the entire field of view of the lens 15 in navigation, object avoidance and/or in any other processes that utilize the observations.

As also discussed, the pattern recognition subsystem 24 operates in a known manner to identify objects or features local to the camera as patterns in the image point data, and the navigation control subsystem then uses the spherical coordinates of the image data points included in the patterns, to determine the locations of the objects and/or features relative to the camera 14. With the locations, the navigation system operates in a known manner to direct the vehicle in a desired direction.

For a regular lens, the system may use $$\xi = -\arctan\left(\frac{r}{f}\right)$$

in the spherical model 18. The spherical model 18 for the regular lens offers similar benefits, with the radial symmetric distortion handled as rotation about the axes of the pin-hole prospective plane and non-systematic, or residual, distortion by correction based on the physical characteristics of the lens and the lens makes equation.

The processors and sub-systems described above may consist of multiple processors or a single processor, the operations performed by the sub-system may be performed in hardware, software or firmware or a combination thereof. Other solutions for the rotation matrix R may be utilized, to map the data onto the model sphere of diameter f that is centered at the prospective center of the pin-hole prospective plane.

What is claimed is:

1. A method for determining locations of objects and features relative to a camera having a lens of a focal point f including:
    processing observations to produce image point data;
    determining angles of incidence of the respective image data points from a perspective center of a perspective plane associated with the lens;
    mapping the image data points to a sphere of diameter f centered at the perspective center based on the angles of incidence,
    identifying one or more patterns corresponding to objects, features, or both, in image data points;
    determining spherical coordinates for the respective image data points associated with the one or more patterns based on the mapping; and
    determining the locations of the objects, features, or both, relative to the camera based on the spherical coordinates of the image data points in the corresponding patterns.

2. The method of claim 1 wherein the mapping comprises rotating a given image data point about a Y axis of the perspective plane to align an optical axis of the camera with an optical axis of the perspective plane; and
    rotating the given image data point about an X axis of the perspective plane to map the image data points to the sphere.

3. The method of claim 2 wherein the rotation about the Y axis is by an angle $$\xi = -\frac{r}{f},$$

where $r = \sqrt{x^2 + y^2}$.

4. The method of claim 3 wherein the lens is a fish-eye lens and the rotation about the Z axis is by an angle $$\beta = -\arctan\left(\frac{y}{x}\right).$$

5. The method of claim 3 wherein the lens is a regular lens and the rotation about the Z axis is by an angle $$\beta = -\arctan\left(\frac{r}{f}\right).$$

6. The method of claim 3 further including correcting the image data points for residual lens distortion before mapping the image data points to the sphere.

7. A system for determining locations of local objects and features relative to a camera with a lens having a focal point f from an image taken by the camera, including
  one or more processors configured to process observations and produce image data points;
  one or more processors configured to determine angles of incidence of the image data points from a perspective center of a perspective plane associated with the lens;
  one or more processors configured to map the image data points to a sphere of diameter f centered at the perspective center based on the angles of incidence and determine spherical coordinates for the respective image data points;
  one or more processors configured to identify one or more patterns corresponding to objects, features, or both, in image data points;
  one or more processors configured to determine the locations of the objects, features, or both, relative to the camera based on the spherical coordinates of the image data points associated with the corresponding patterns.

8. The system of claim 7, wherein the one or more processors configured to map the image are further configured to
  rotate a given image data point about a Y axis of the perspective plane to align an optical axis of the camera with an optical axis of the perspective plane; and
  rotate the given image data point about an X axis of the perspective plane to map the image data points to the sphere.

9. The system of claim 8 wherein the one or more processors are configured to rotate the image data point about the Y axis by an angle $$\xi = -\frac{r}{f},$$

where $r=\sqrt{x^2+y^2}$.

10. The system of claim 9 wherein the one or more processors are configured to rotate image data points associated with a fish-eye lens about the Z axis by an angle $$\beta = -\arctan\left(\frac{y}{x}\right).$$

11. The system of claim 9 wherein the one or more processors are configured to rotate the image data points associated with a regular lens about the Z axis by an angle $$\beta = -\arctan\left(\frac{r}{f}\right).$$

12. The system of claim 9 wherein the one or more processors are configured to correct the image data points for residual lens distortion before mapping the image data points to the sphere.

13. A camera image processing subsystem
  one or more processors configured to utilize image data points corresponding to observations made using a lens of focal point f and determine angles of incidence of the image data points from a perspective center of a pin-hole perspective plane associated with the lens;
  one or more processors configured to map the image data points to a sphere of diameter f centered at the perspective center based on the angles of incidence and determine corresponding spherical coordinates for the respective image data points.

14. The system of claim 13, wherein the one or more processors configured to map the image are further configured to
  rotate a given image data point about a Y axis of the perspective plane to align an optical axis of the camera with an optical axis of the perspective plane; and
  rotate the given image data point about an X axis of the perspective plane to map the image data points to the sphere.

15. The system of claim 14 wherein the one or more processors are configured to rotate the image data point about the Y axis by an angle $$\xi = -\frac{r}{f},$$

where $r=\sqrt{x^2+y^2}$.

16. The system of claim 15 wherein the one or more processors are configured to rotate image data points associated with a fish-eye lens about the Z axis by an angle $$\beta = -\arctan\left(\frac{y}{x}\right).$$

17. The system of claim 15 wherein the one or more processors are configured to rotate the image data points associated with a regular lens about the Z axis by an angle $$\beta = -\arctan\left(\frac{r}{f}\right).$$

18. The system of claim 15 wherein the one or more processors are configured to correct the image data points for residual lens distortion before mapping the image data points to the sphere.

19. The system of claim 13 further including one or more processors configured to determine objects, features or both as patterns in the image data points and determine relative locations of the objects, features or both using the associated spherical coordinates associated with the patterns.

* * * * *